R. KROEDEL.
TRIPOD ADAPTER.
APPLICATION FILED FEB. 12, 1919.
1,357,639.
Patented Nov. 2, 1920.
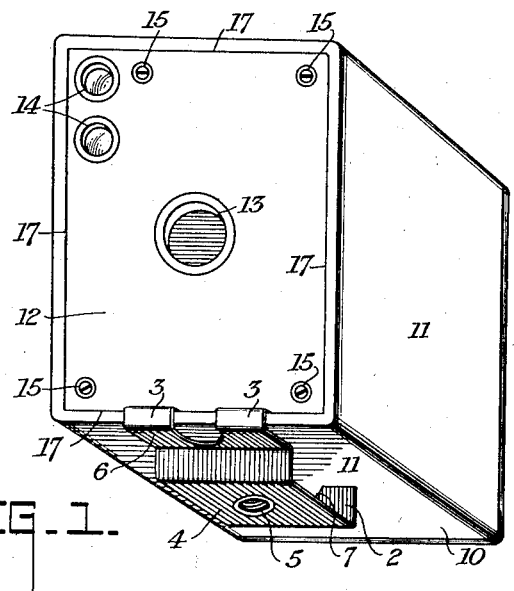
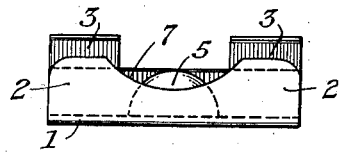
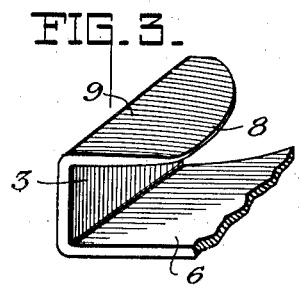
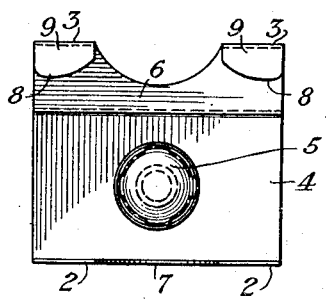
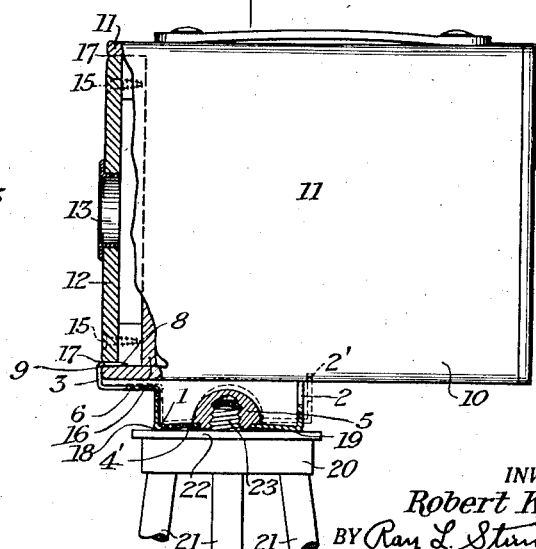
INVENTOR.
Robert Kroedel,
BY Ray L. Stinchfield
Donald H. Stewart,
ATTORNEYS.

UNITED STATES PATENT OFFICE.

ROBERT KROEDEL, OF ROCHESTER, NEW YORK, ASSIGNOR TO EASTMAN KODAK COMPANY, OF ROCHESTER, NEW YORK, A CORPORATION OF NEW YORK.

TRIPOD-ADAPTER.

1,357,639.

Specification of Letters Patent.  Patented Nov. 2, 1920.

Application filed February 12, 1919. Serial No. 276,638.

*To all whom it may concern:*

Be it known that I, ROBERT KROEDEL, a citizen of the United States of America, residing at Rochester, in the county of Monroe and State of New York, have invented certain new and useful Improvements in Tripod-Adapters, of which the following is a full, clear, and exact specification.

This invention relates to photography, and more particularly to an adapter used for fastening a camera containing no built-in tripod nut to a tripod or other camera support. The principal object of my invention is to provide an attachment which will allow the owner of such a camera to use it for a stand camera when desired, by attaching my device, which is simple in construction, light and compact. I further provide an adapter which may be left on either the camera, or the tripod or other support, as desired, so that it need not be carried in the pocket when not in use. I further provide an adapter in which the construction is such that the weight of the camera tends to cause the adapter to hold more firmly, instead of to weaken the spring action as in some other types of adapters.

To these and to other ends this invention consists in improvements and combination of parts as will be hereinafter described, the novel features being pointed out in the claims at the end of the specification.

In the drawings, in which like characters designate the same parts throughout:

Figure 1, is a perspective of my adapter fastened to a box camera.

Fig. 2, is an end view of the adapter.

Fig. 3, is an enlarged fragmentary perspective of one of the camera engaging arms.

Fig. 4, is a half section through my tripod adapter, showing it mounted on a tripod and having a box camera, shown partly in section and partially in elevation, affixed thereto.

Fig. 5, is a plan view of my adapter.

A number of types of adapters have been designed for fastening cameras to supports, some being attached by springs spanning the camera body, and some fastening to either the front board or bed. In most types the attachments were open to the objection that the steadiness of the camera depended largely upon the strength of the spring. In my adapter the weight of the camera body is held in such a way that the spring is in no way weakened by supporting the camera body, the tripod taking the weight of the camera instead of the spring.

My tripod socket plate, or tripod adapter as I prefer to call it, consists of a metal plate or strip 1, formed up at one end to provide supporting arms 2, 2 and formed at the opposite end to form engaging arms 3, 3. Between these end portions there is a base 4 supporting a tripod socket 5, the base 4 also acting as a contacting surface with a tripod head. Between this base 4 and the engaging arms 3, 3 there is a raised portion 6, which is spaced from the engaging arms 3, 3 a sufficient distance to allow clearance; the camera does not rest on this raised portion. The base 4 may be made flat, as shown in Fig. 1, but I prefer to make it slightly concave, 4', as best illustrated in Fig. 4, since this form has numerous advantages, which will be hereinafter described. The supporting arms 2, 2 are relatively narrow, the recess 7 being made to relieve the long flat edge which would otherwise result from forming up the metal strip 1, since two contacting surfaces are preferable to one long one. This is not essential however, and a single wide supporting arm may be used. The engaging arms 3, 3 are preferably shaped like wedges or knife blades, as shown in Fig. 3 and Fig. 5. The edge of the arm 3 is rounded so that only a small flattened portion 8 enters a slot first, and is wedged tightly in the slot by the wider and thicker metal 9 at the rear of the arm 3. Between the engaging arms 3 and the supporting arms 2 there is a spring tension formed in the metal strip 1, tending to force the supporting arms 2 upwardly, when the engaging arms are inserted into a slot in a camera in operative position. In Figs. 1 and 4 I show my adapter fastened to a well known type of box camera, 10, which consists of sides 11, and a front board 12. The front board is centrally apertured at 13 for the admission of light to the lens and has two finder lens apertures 14. Four screws 15 hold this front board to the camera body 16. I have described only such parts as pertain to the use of my invention. To fasten the adapter, enter edges 8 of the engaging arms 3 into the slot 17 between front board 12 and the sides 11 on the vertical or horizontal side, as desired, slightly spring down the supporting arms 2, 2 and force the arms 3 in until the thicker and wider part 9 wedges the arms tightly in slot 17. The supporting arms 2 will be spring pressed tightly against the camera side 11. In Fig. 4 the dotted lines 2' show the normal position of the supporting arms relative to the engaging arms 3 when not in position on a camera. In Fig. 4 it should also be noted that as the adapter supports the camera from a position forward of the central line of the camera, the weight of the camera presses against the supporting legs 2 of the adapter, and that no stress is put on which tends to weaken the spring between the ends 2 and 3 of the adapter. These features make a substantial and firm tripod socket attachment.

Referring to Fig. 4, a standard type of tripod 20 is illustrated, with legs 21, head 22, and screw 23. When the adapter is screwed on the tripod the concave surface 4' forms two slightly resilient bearing surfaces, 18 and 19 so that close contact with the tripod head 22 is assured. This construction also prevents the adapter from riding up on any irregularity which might occur on the face of the tripod head or in a flat metal base, as at 4, Fig. 1, or upon the bottom of the tripod nut 5, if it should be fastened so as to project below, instead of to be flush with the bottom of the base 4'. In either case the necessary firmness would not be obtained.

Still another feature of the concave base 4' is that it provides an effectual means for tightening the camera to the adapter and at the same time tightening the adapter upon the tripod. I can be seen from Fig. 4 that as the tripod socket 5 is tightened on the screw 23 of the tripod, the metal base 4' will tend to flatten as points 18 and 19 are brought into contact with the tripod head 22. This thrusts up on the supporting arms 2, 2 and engaging arms 3, 3, thereby grasping the camera more firmly. At the same time the spring action of base 4' tends to bind the screw 23 more firmly into the nut 5. This double tightening action greatly increases the firmness and steadiness of the camera.

By providing an attachment which can be securely fastened to both the camera and tripod, I have produced an adapter which will hold a camera with sufficient firmness to be practical. It may be left for convenience on either the camera or the tripod, so it is not necessary to carry an extra part. It is understood that any form of camera stand or holder may be used which has a screw for fastening to a tripod nut.

Having thus described my invention, what I claim as new and desire to secure by Letters Patent is:

1. In combination with a camera having a slot in one side near the bottom thereof, a tripod adapter having a base with a screw socket, one edge of the base bent to form a flange lying substantially parallel to the base and tapered so that it can be forced into the slot, the other end of the base bent to form a flange that will be forced by the resiliency of the base into contact with the bottom of the camera, when the tapered flange is engaged in the slot.

2. An adapter made of resilient sheet metal and comprising a base turned up at each end to form shoulders adapted to bear against a tripod head, one turned up end having an overhanging sharpened flange, and the other turned up end having a straight upper edge that will be forced against the bottom of a camera by the resilient action of the adapter when the sharpened edge is engaged in a slot in the side of the camera, the base being concave downwardly and having a central screw socket.

3. A tripod adapter having a resilient base that is concave on its lower surface and provided with a screw socket, one end of the base being upturned to form a flange adapted to contact the body of a camera, the base at this point forming a shoulder, the other end of the base being upturned and carrying means to engage a camera and hold the adapter thereto, the base at the upturned portion constituting a second shoulder, the two shoulders, when the adapter is screwed upon a tripod head, being adapted to engage such head and be thus sprung upwardly to increase the frictional engagement between the screw members.

4. In an adapter for securing a camera to a tripod, the combination of a concave plate having bent up ends, a tripod socket between the two ends, one bent up end adapted to contact with the camera body, the other end having an engaging portion insertible into the camera, said concave base and bent up ends forming shoulders adapted to contact with the tripod head, whereby both the camera and the tripod will tend to be secured more tightly to the adapter as the socket is screwed to the tripod.

Signed at Rochester, New York, this 10th day of February, 1919.

ROBERT KROEDEL.